Patented Feb. 25, 1930

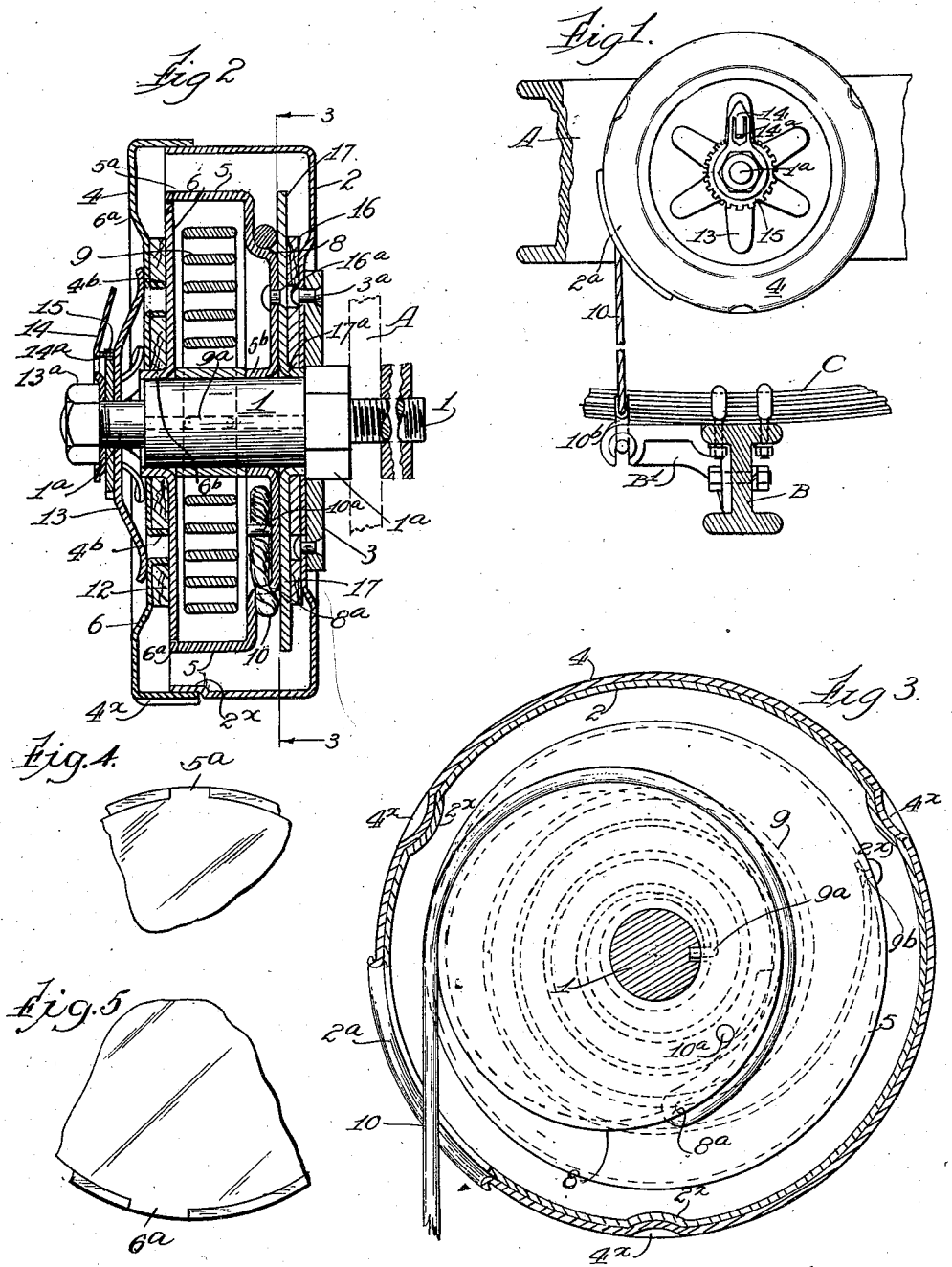

1,748,664

UNITED STATES PATENT OFFICE

WALTER VAN GUILDER AND ANDREW C. WOOD, OF CHICAGO, ILLINOIS, ASSIGNORS TO STEWART-WARNER CORPORATION, OF CHICAGO, ILLINOIS, A CORPORATION OF VIRGINIA

SHOCK ABSORBER

Application filed October 18, 1923, Serial No. 669,216. Renewed October 24, 1924.

The purpose of this invention is to provide an improved construction in a shock absorber for road vehicles which shall be adapted better or differently from devices of this character in common use for checking rebound and absorbing the shock due to unevenness of the road in travel. It consists in the elements and features of construction shown and described as indicated in the claims.

In the drawings:

Figure 1 is a detail side elevation diagrammatic in character showing the two elements of the vehicle which are spring-separated—as the longitudinal bar of the chassis and axle—equipped with a shock absorber embodying this invention.

Figure 2 is a section axial with respect to the shock absorber casing and contents.

Figure 3 is a section at the line 3—3 on Figure 2.

Figures 4 and 5 are detail side elevations of opposite segments of the drum showing the interlocking of one head with the cup member.

In the construction shown in the drawings, A represents the chassis or frame of the vehicle, C the spring operating in the ordinary construction of the vehicle for spreading apart—separating vertically—the frame or body of the vehicle and the axle. The shock absorber device comprises a stud journal bolt, 1, mounted fixedly upon the chassis frame bar, A, as indicated in Figure 2. Upon this stud bolt there is mounted fixedly with respect thereto, as to rotation thereabout, a casing comprising a cup member, 2, and a cover member, 4, the said casing being held non-rotatable with respect to the stud or journal bolt, 1, by virtue of a relatively thick plate, 3, which is riveted against the outer side of the bottom of the cup member, 2, of the casing and engaged with the hexagonal shoulder, 1$^a$, of the journal bolt, 1. The cover member, 4, is engaged with the cup member, 2, against rotation by cooperation bosses on the two members indicated at 2$^x$ and 4$^x$. Within the casing there is mounted rotatably upon the journal bolt or stud, 1, a drum comprising a cup member, 5, of which the bottom web constitutes one head of the drum, and a closure member, 6, constituting the other head of the drum, the two cup members being non-rotatively engaged as indicated at 5$^a$ and 6$^a$, both of said members being annular and having at their inner circumferences flanges, 5$^b$ and 6$^b$, for seating on the journal bolt. Within this drum there is contained a helically coiled spring, 9, the inner end of which is engaged as shown at 9$^a$, with the journal bolt, 1, the outer end being engaged as shown at 9$^b$, with the peripheral wall of the drum,—the cylindrical flange of the cup member, 5. Said cup member, 5, of the drum is formed with an exterior shoulder, 8, eccentric with respect to the journal bolt, said shoulder being adapted for winding thereon a flexible connector as a wire cable or the like, 10, said connector being secured to the drum at said shoulder as seen in Figures 2 and 3 by having the end inserted through an aperture, 8$^a$, in the shoulder, 8, and lapped around inside said shoulder, a pin, 10$^a$, serving as a means of holding it thus lapped and hooked into the shoulder. The peripheral wall of the casing has an aperture, 2$^a$, through which the flexible connector, 10, emerges from the casing for attachment by any suitable means to the axle, B, said attachment being conveniently made as seen in Figure 1 by means of a hook bracket, B$^1$, bolted to the axle and engaging an eye, 10$^b$, secured to the flexible connector, 10.

Within the casing secured to the inner side of the cover member, 4, against rotation relatively thereto is an annular friction plate, 12, desirably made of fibre or wood or like material adapted for absorbing or being charged with lubricant so as to become self lubricating as to its inner surface which bears frictionally against the outer surface of the cover plate, 6, of the drum for developing friction in the rotation of the drum by winding and unwinding of the flexible connector, 10, thereon. The means for securing this friction plate non-rotatably with respect to the casing consists in a boss or bosses, 4$^b$, struck inwardly from the casing cover member, 4, and engaging apertures in the friction plate, 12. For pressing this friction plate, 12, against the drum for friction as indicated, there is provided outside the casing a star-shaped spring disk member, 13, mounted on the reduced end, 1ª, of the journal bolt, a nut 13ª, being screwed onto the threaded end of the journal bolt outside of the spring disk to press the sprink disk against the outer side of the cover member, 4, of the casing to collapse or close up the casing and thereby press the friction plate, 12, against the adjacent wall of the drum more or less firmly according to the tension given the spring disk by screwing up the nut. A locking washer, 14, is provided between the nut and the spring disk, this washer having a tooth, 14ª, engaging a toothed or notched disk, 15, which is fast on the outer surface of the spring disk, 13. The detail construction of this nut-locking device is not a part of the present invention, and is thus briefly described only for interpretation of the drawings in which it is necessarily presented.

At the opposite side of the drum from that at which the friction plate, 12, is mounted, there is mounted upon the inner side of the bottom of the cup member, 2, of the casing a second friction plate, 16, held non-rotatably to the casing wall by engagement of apertures, 16ª, in said friction plate with the heads of the rivets, 3ª, by which the plate, 3, is secured to the casing. To afford suitable friction-bearing surface of this friction plate against the adjacent wall of the drum, there is mounted upon the outer side of said wall a metal plate, 17, riveted to the bottom of the cup member, 5, of the drum, said plate, 17, having the full diameter of the drum and having at its inner circumference a flange, 17ª, for affording additional journal bearing surface in the drum on the journal bolt, 1. Being of the diameter stated, this plate extends beyond the eccentric shoulder, 8, upon which the flexible connector, 10, is wound, and thereby affords a lateral guard for retaining the flexible connector on the shoulder as may be understood most clearly from Figure 2.

The construction described is mounted and operates as follows:—The casing with its contents being mounted as described upon the vehicle body or chassis as indicated and the hook bracket, B¹, being secured to the axle, the flexible connector, 10, is drawn out through the aperture, 2ª, of the casing causing the rotation of the drum in the direction for tightening the spring, 9; and desirably the connector will in this process be withdrawn to a sufficient extent to rotate the drum approximately to the position shown in Figure 3, that is, so that the cable runs off the shoulder, 8, of the drum at the most eccentric point thereof, that is, at the end of the longest radius. When the drum has been rotated and the spring tensioned to this extent, the flexible connector will be secured to the hook, B¹. The tension of the spring, 9, thus operates in opposition to the tension of the vehicle spring, C. When the vehicle is in service on the road and exposed to jolts tending to cause the vehicle body with its load first to descend against the spring action of the vehicle spring, C, and then to recoil or rebound, the first descending movement slacking the flexible connector, 10, permits the spring, 9, to react and to take up the slack; and the recoil or rebound, unwinding or drawing off the flexible connector from the eccentric shoulder of the drum, tightens the spring, 9, and is therefore resisted by the tension of that spring. It will be observed that in the descent of the vehicle body causing it to approach the axle and slacken the flexible connector, the resultant rotation of the drum under the reaction of its spring, 9, winds the cable initially with the advantage of the longest radius of the eccentric shoulder and with diminishing radius as the vehicle body descends; in consequence, the angular movement of the drum for friction between the drum and the friction plates, 12 and 15, is least at the commencement of the descent, and increases as the vehicle descends farther and farther. That is to say the frictional resistance to the descent of the vehicle under the jolt of travel increases concurrently with the increase in resistance of the vehicle spring, C, to the descent. In the recoil or rebound of the vehicle from the lowest point to which it may descend the cable runs off from the drum in rotating the latter for tightening the spring, from the end of a radius less than the longest, the radius increasing to the longest radius of the eccentric as the recoil or rebound continues, up to the normal or rest position of the vehicle body, and then diminishes as the recoil carries the vehicle body above that normal or rest position. From this it results that the angular movement of the drum with respect to the friction plates is greatest at the commencement of the recoil and diminishes from that point until the vehicle reaches its normal or rest position and again increases as the vehicle body passes that normal position and reaches a maximum at some point above the normal position at which the recoil is checked by the maximum frictional resistance to the rotation of the drum with respect to the casing; and it will be observed that while in the recoil the frictional resistance is maximum at the beginning and end of the movement and minimum at the rest position, the drum spring, 9, operates with a steadily increasing tensional resistance from the beginning to the end of the recoil or rebound movement. Both resistances to the recoil, therefore, reach their maximum at the highest position reached by the vehicle in rebound, both resistances being on increase from the point at which the vehicle passes the normal or rest position.

We claim:—

1. In a device for the purpose indicated a rotatable member; a fixed journal bearing member adapted for mounting on one of the two spring-separated members of the vehicle to be served; the rotatable member having a seat upon which a flexible connector may be wound in the rotation of the said rotatable member; a flexible connector attached at one end to the rotatable member and passing over said seat and extending therefrom in direction for attachment to the other of said spring-separated members of the vehicle; a fixedly mounted friction plate and means for stressing said plate and the rotatable member against each other, the parts being formed and dimensioned to render the pressure and area of frictional contact between the rotatable member and the friction plate substantially constant throughout the range of rotative movement; the seat for the flexible connector being eccentric with respect to the fixed journal bearing member, whereby the radius of leverage for rotation against the frictional resistance increases in one direction of rotation and diminishes in the opposite direction while the friction remains constant, the radius of the surface of the rotatable member extending in one plane at the side thereof with which the friction plate co-operates for friction being in excess of the greatest radius of the eccentric seat of the flexible connector; whereby the friction plate does not at any point or in any stage of the rotation, protrude beyond the circumference of said surface of the rotating member with which it co-operates for friction.

2. In a device for the purpose indicated a rotatable member; a fixed journal bearing member adapted for mounting on one of the two spring-separated members of the vehicle to be served; the rotatable member having a seat upon which a flexible connector may be wound in the rotation of the said rotatable member; a flexible connector attached at one end to the rotatable member and passing over said seat and extending therefrom in direction for attachment to the other of said spring-separated members of the vehicle; a fixedly mounted friction plate and means for stressing said plate and the rotatable member against each other, the parts being formed and dimensioned to render the pressure and area of frictional contact between the rotatable member and the friction plate substantially constant throughout the range of rotative movement; the seat for the flexible connector being eccentric with respect to the fixed journal bearing member, whereby the radius of leverage for rotation against the frictional resistance increases in one direction of rotation and diminishes in the opposite direction while the friction remains constant, a plate applied and secured against the side of the rotatable member at which the eccentric seat for the flexible connector is situated, and a friction plate secured fixedly as against rotation for co-operating for friction with said applied plate at the side thereof opposite said eccentric seat, said applied plate having its radius from the center of the journal bearing at least as great as the longest radius of said eccentric seat; whereby said applied plate forms a guard at the outer side of said seat for retaining the flexible connector thereon, and at all positions in the rotation of the rotatable member extends beyond the circumference of the fixed friction plate with which it co-operates.

3. In a device for the purpose indicated a rotatable member; a fixed journal bearing member adapted for mounting on one of the two spring-separated members of the vehicle to be served; the rotatable member having a seat upon which a flexible connector may be wound in the rotation of the said rotatable member; a flexible connector attached at one end to the rotatable member and passing over said seat and extending therefrom in direction for attachment to the other of said spring-separated members of the vehicle; a fixedly mounted friction plate and means for stressing said plate and the rotatable member against each other, the parts being formed and dimensioned to render the pressure and area of frictional contact between the rotatable member and the friction plate substantially constant throughout the range of rotative movement; the seat for the flexible connector being eccentric with respect to the fixed journal bearing member, whereby the radius of leverage for rotation against the frictional resistance increases in one direction of rotation and diminishes in the opposite direction while the friction remains constant, the rotatable member being in the form of a drum enclosing the spring, the eccentric seat for the flexible connector being on one head of the drum, a supporting structure fixed with respect to the journal bearing member comprising a member at the opposite side of the drum from said head movable axially with respect to the remainder of the supporting structure, the friction plate being mounted upon said last mentioned axially movable member for co-operating for friction with the head of the drum opposite that having the eccentric seat for the flexible connector.

4. In a device for the purpose indicated, a rotatable member in the form of a drum; a fixed journal bearing member for said drum adapted for mounting on one of the two spring-separated members of the vehicle served by the device; a spring connected with the journal bearing member and drum for being tensioned by the rotation of the drum in one direction and being rotated in the opposite direction by the reaction of the spring; a supporting structure fixed with respect to the journal bearing member encompassing the drum and spring, the drum having on one head a seat for winding thereon a flexible connector; a connector having one end secured to the drum head and extending over said seat and tangentially therefrom in the direction for attachment of its other end to the other of the two spring-separated members of the vehicle; said supporting structure comprising a member mounted at the opposite side of said drum from the head which has the flexible connector seat, axially movable and non-rotatable with respect to said frame structure, a friction plate carried by said non-rotatable member bearing laterally against the adjacent head of the drum for frictional co-operation therewith, and a spring reacting between the fixed journal bearing member and said non-rotatable member of the frame structure for stressing said friction plate against said drum head; the seat for the flexible connector being eccentric with respect to the fixed journal bearing member, whereby the radius of leverage in favor of the connector for tensioning the spring in unwinding the connector from said seat diminishes from a certain point in the unwinding which increases the tension of the spring.

In testimony whereof, we have hereunto set our hands at Chicago, Illinois, this 13th day of October, 1923.

WALTER VAN GUILDER.
ANDREW C. WOOD.